United States Patent [19]

Lee

[11] Patent Number: 4,789,801
[45] Date of Patent: Dec. 6, 1988

[54] ELECTROKINETIC TRANSDUCING METHODS AND APPARATUS AND SYSTEMS COMPRISING OR UTILIZING THE SAME

[75] Inventor: Jimmy L. Lee, Santa Rosa, Calif.

[73] Assignee: Zenion Industries, Inc., Rohnert Park, Calif.

[21] Appl. No.: 34,291

[22] Filed: Apr. 3, 1987

Related U.S. Application Data

[63] Continuation-in-part of Ser. No. 838,400, Mar. 6, 1986, abandoned, which is a continuation of Ser. No. 127,646, Mar. 6, 1980, abandoned.

[51] Int. Cl.$^4$ .......................... H02N 1/04; B03C 3/06; B03C 3/12
[52] U.S. Cl. ..................... 310/308; 323/903; 55/138; 361/235; 381/111
[58] Field of Search ............... 381/124, 190, 191, 111, 381/165; 55/2, 105, 134, 135, 137, 138; 361/229, 230, 231, 235; 310/10, 11, 300, 308, 309; 323/903

[56] References Cited

U.S. PATENT DOCUMENTS

| | | | |
|---|---|---|---|
| 2,949,550 | 9/1960 | Brown | 310/309 |
| 3,892,927 | 7/1975 | Lindenberg | 381/191 |
| 4,126,434 | 11/1978 | Keiichi | 55/137 |
| 4,232,355 | 11/1980 | Finger et al. | 55/139 |
| 4,259,707 | 3/1981 | Penney | 361/212 |
| 4,369,776 | 1/1983 | Roberts | 219/272 |

Primary Examiner—Patrick R. Salce
Assistant Examiner—Judson H. Jones
Attorney, Agent, or Firm—Townsend and Townsend

[57] ABSTRACT

Electrokinetic transducing methods and systems are disclosed in which the two electrode arrays confront each other and each electrode in one array is equidistant from the two nearest electrodes in the other array. The electrode arrays are excited by pulsed exciting voltages, the individual pulses of which are preferably all negative or all positive, have durations equal to or less than the pulse intervals, and have rounded leading knees. Embodiments of the invention are disclosed for applications including electrokinetic loudspeakers, ion generators, fans, and electrostatic precipitators.

21 Claims, 8 Drawing Sheets

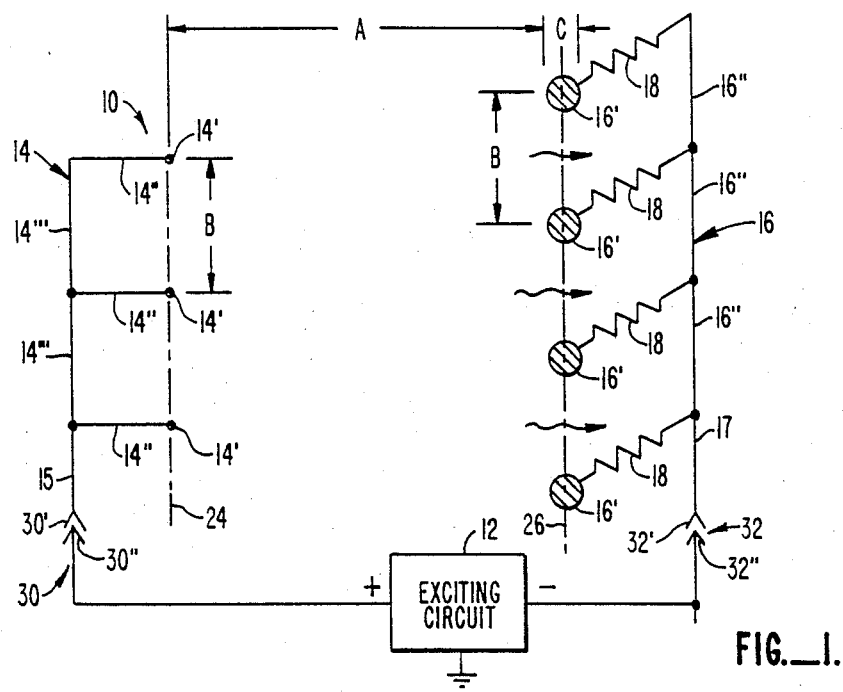
FIG._1.
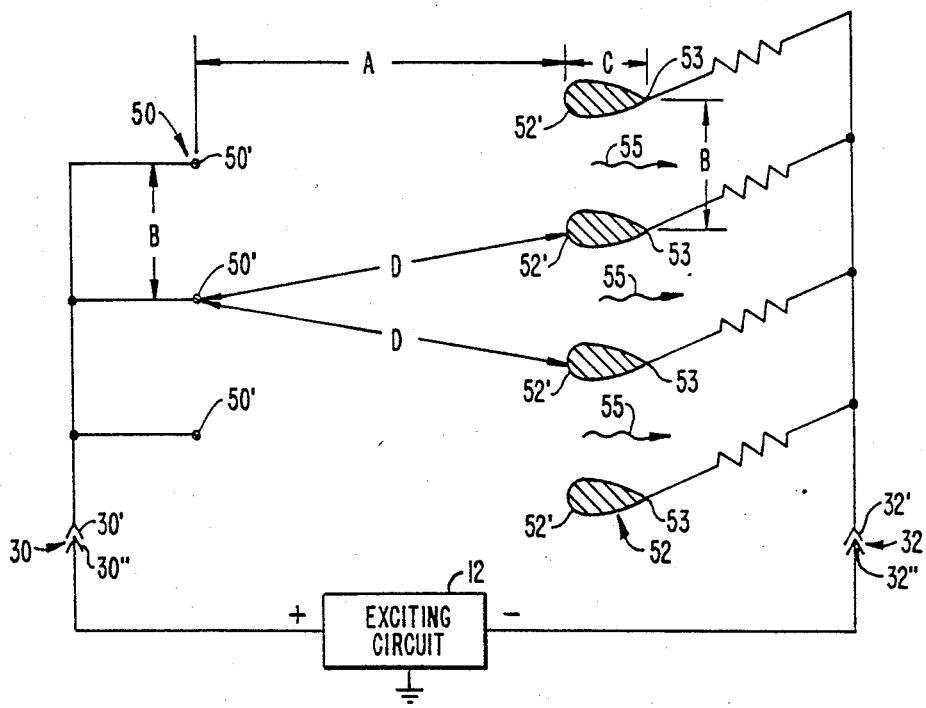
FIG._2.

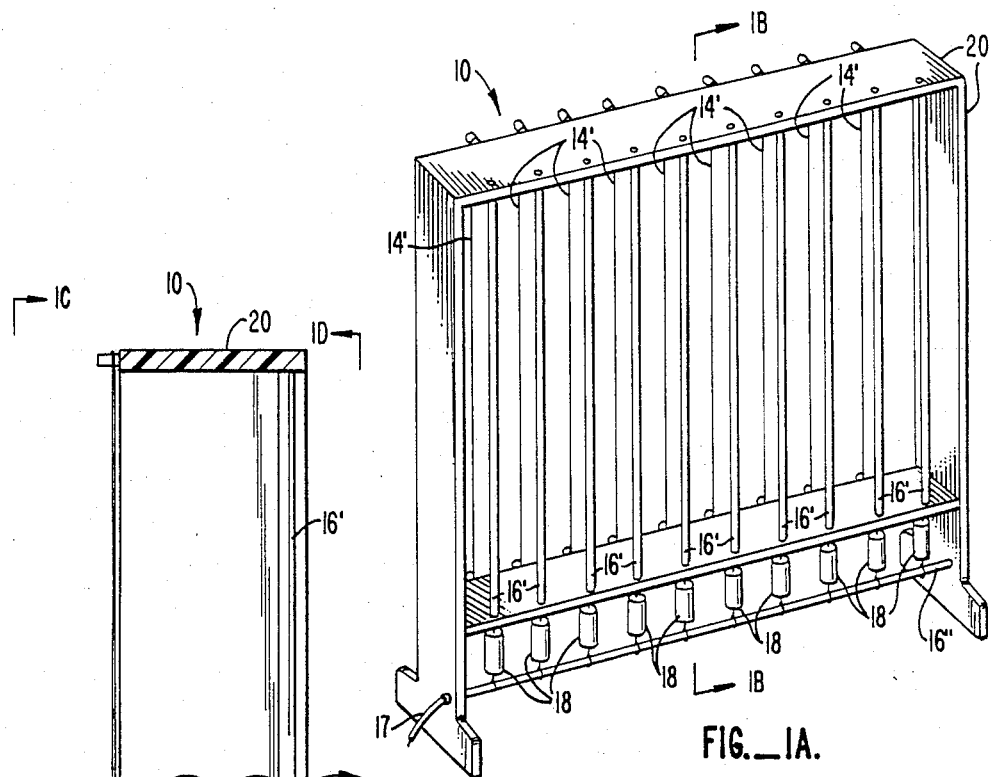
FIG._1A.
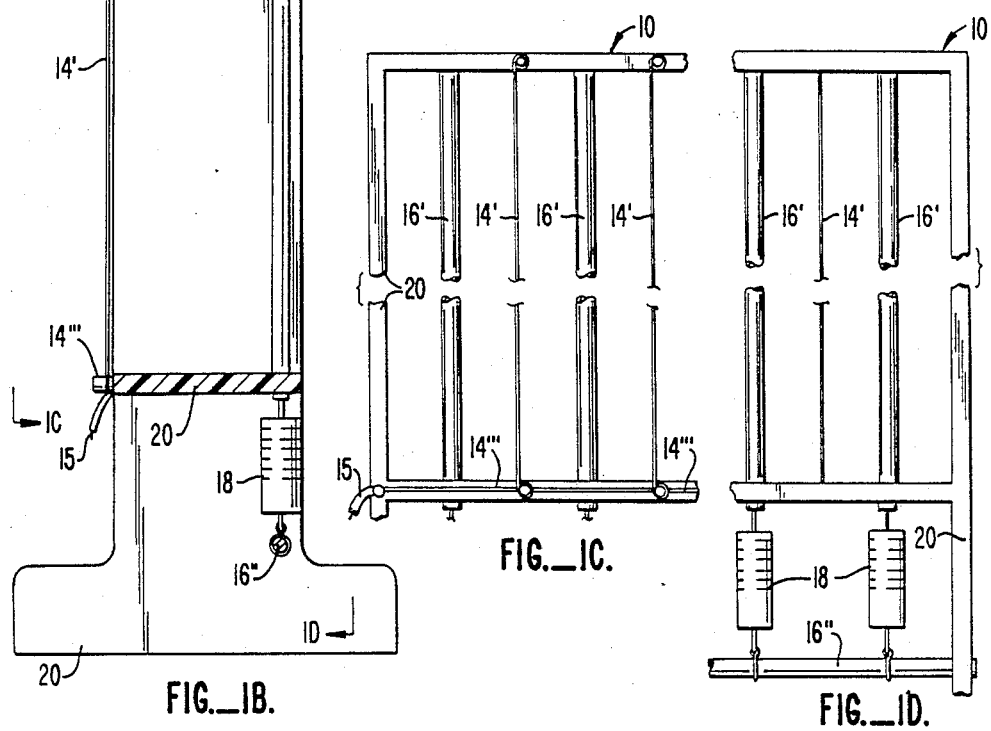
FIG._1B.  FIG._1C.  FIG._1D.

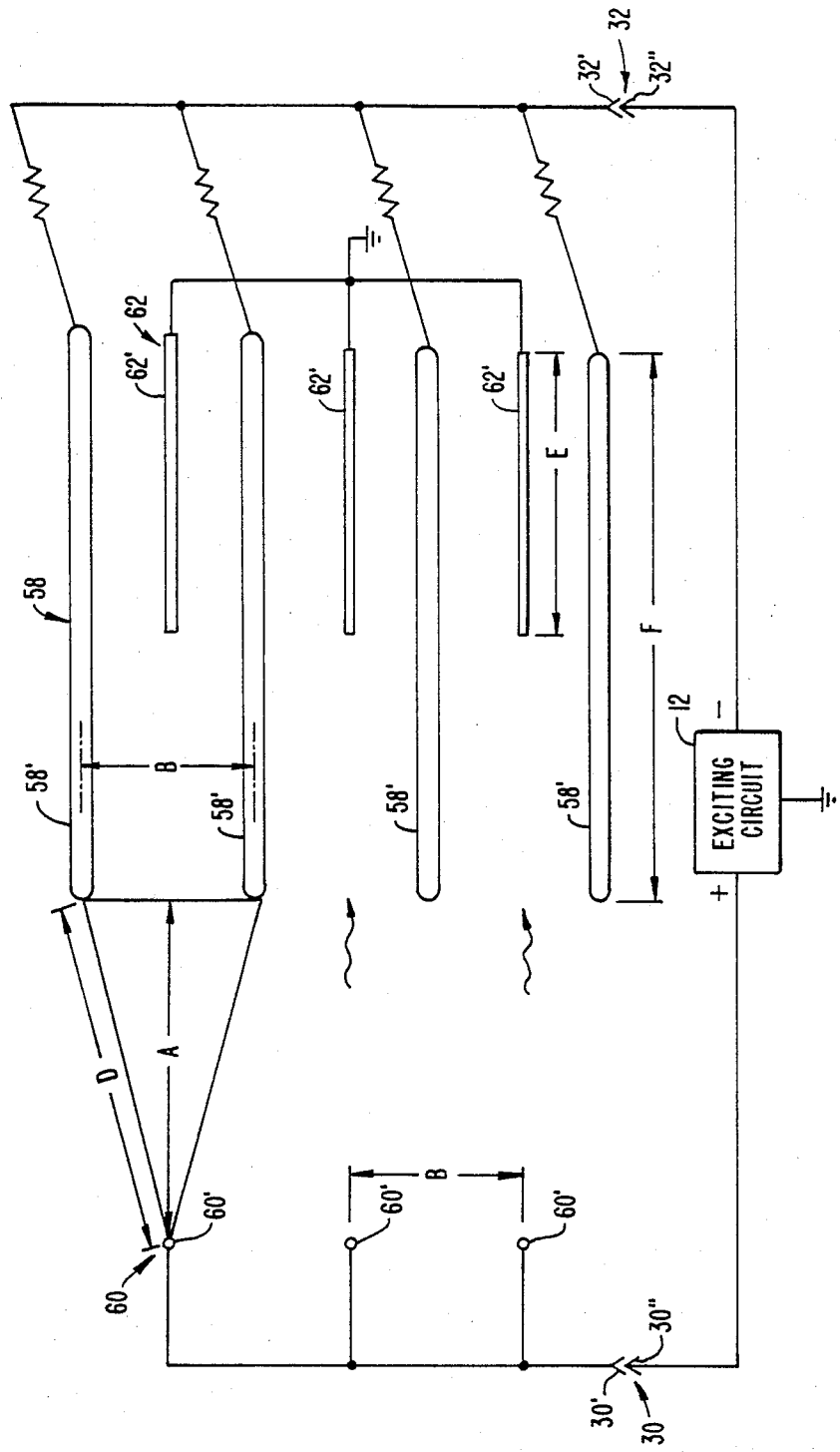
FIG._3.

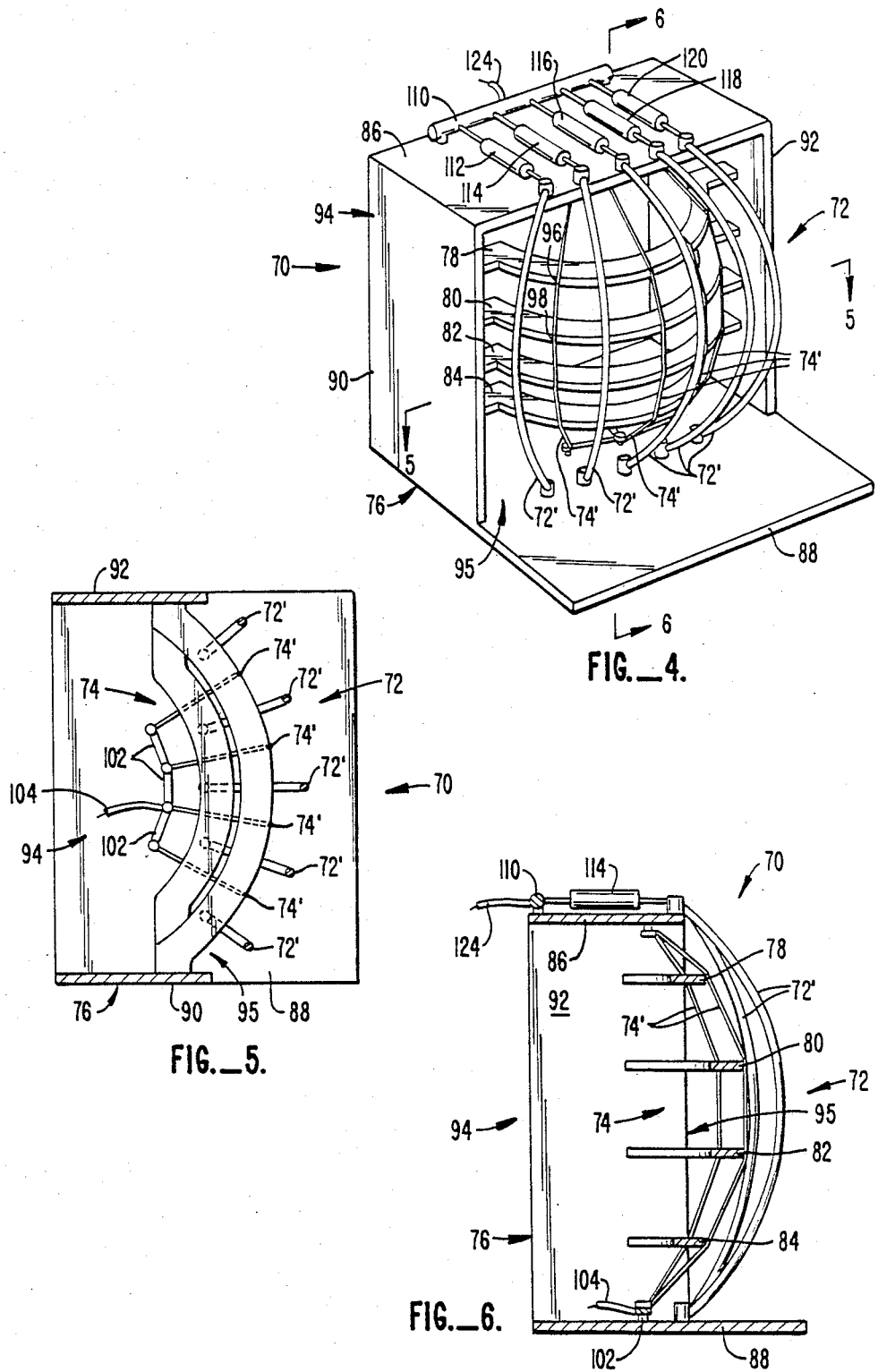
FIG._4.
FIG._5.
FIG._6.

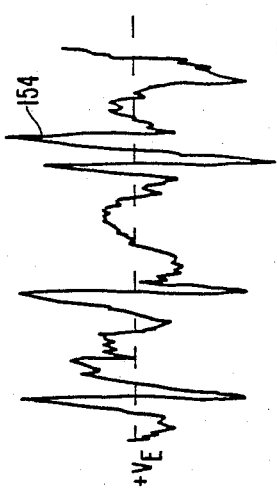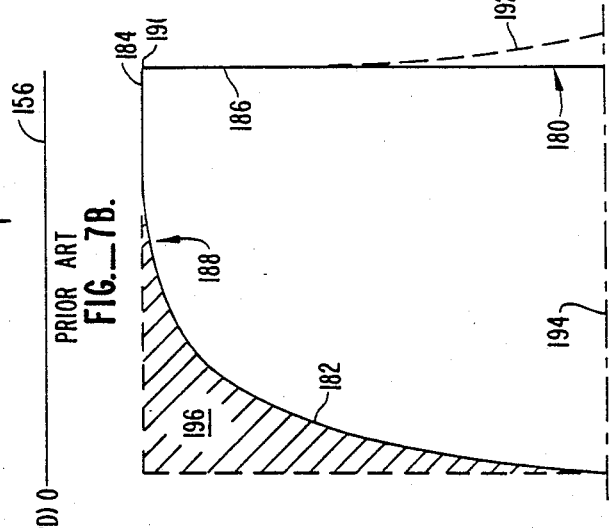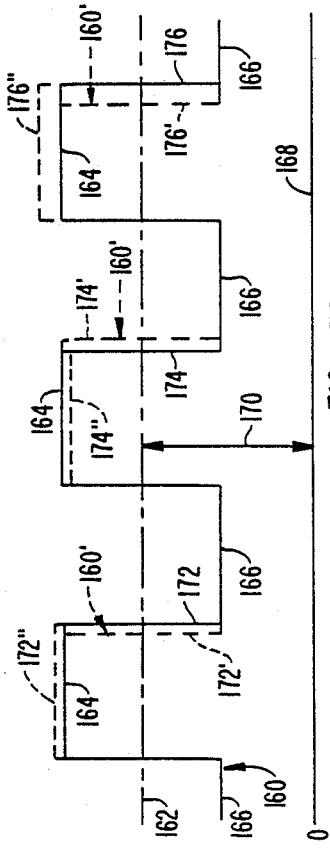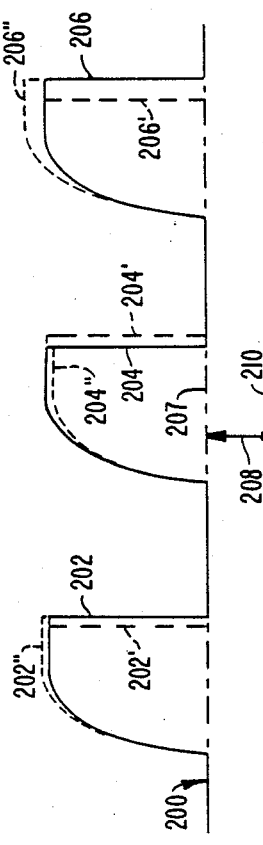

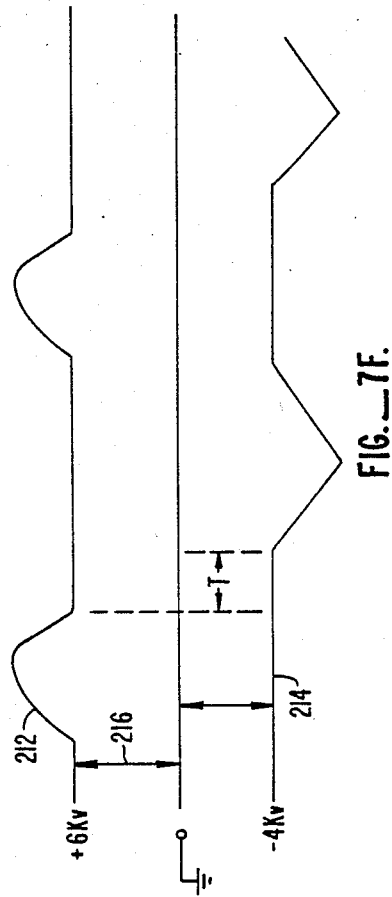
FIG._7F.
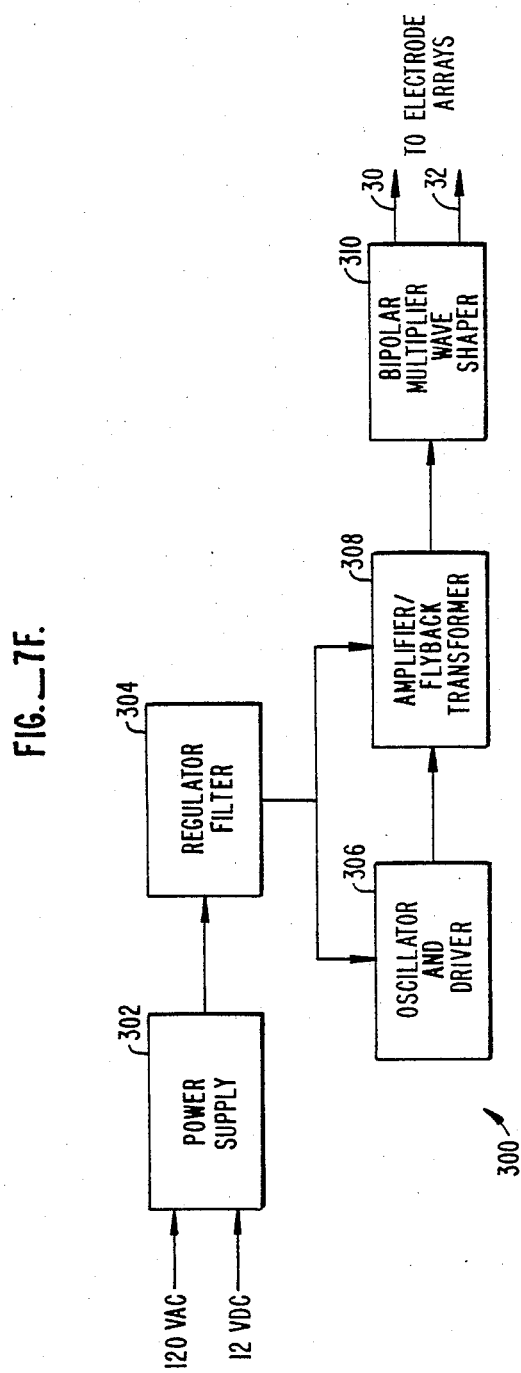
FIG._9.

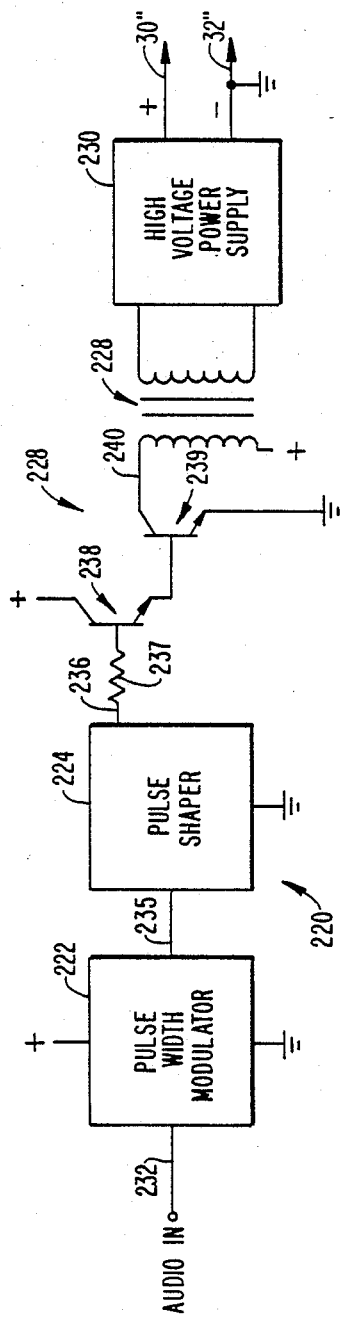
FIG._8A.
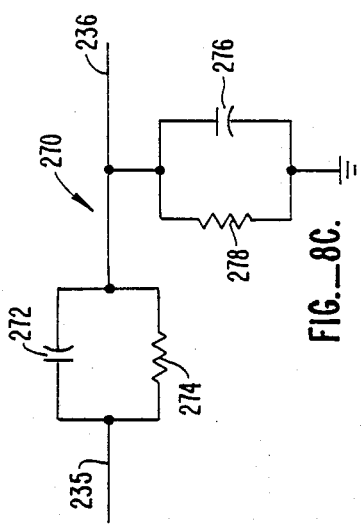
FIG._8C.
FIG._8D.
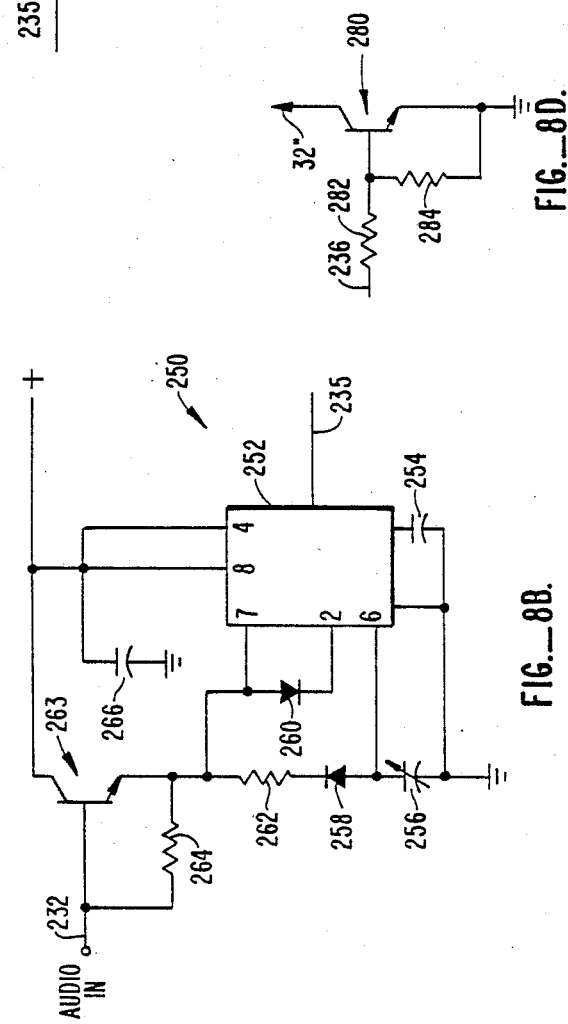
FIG._8B.

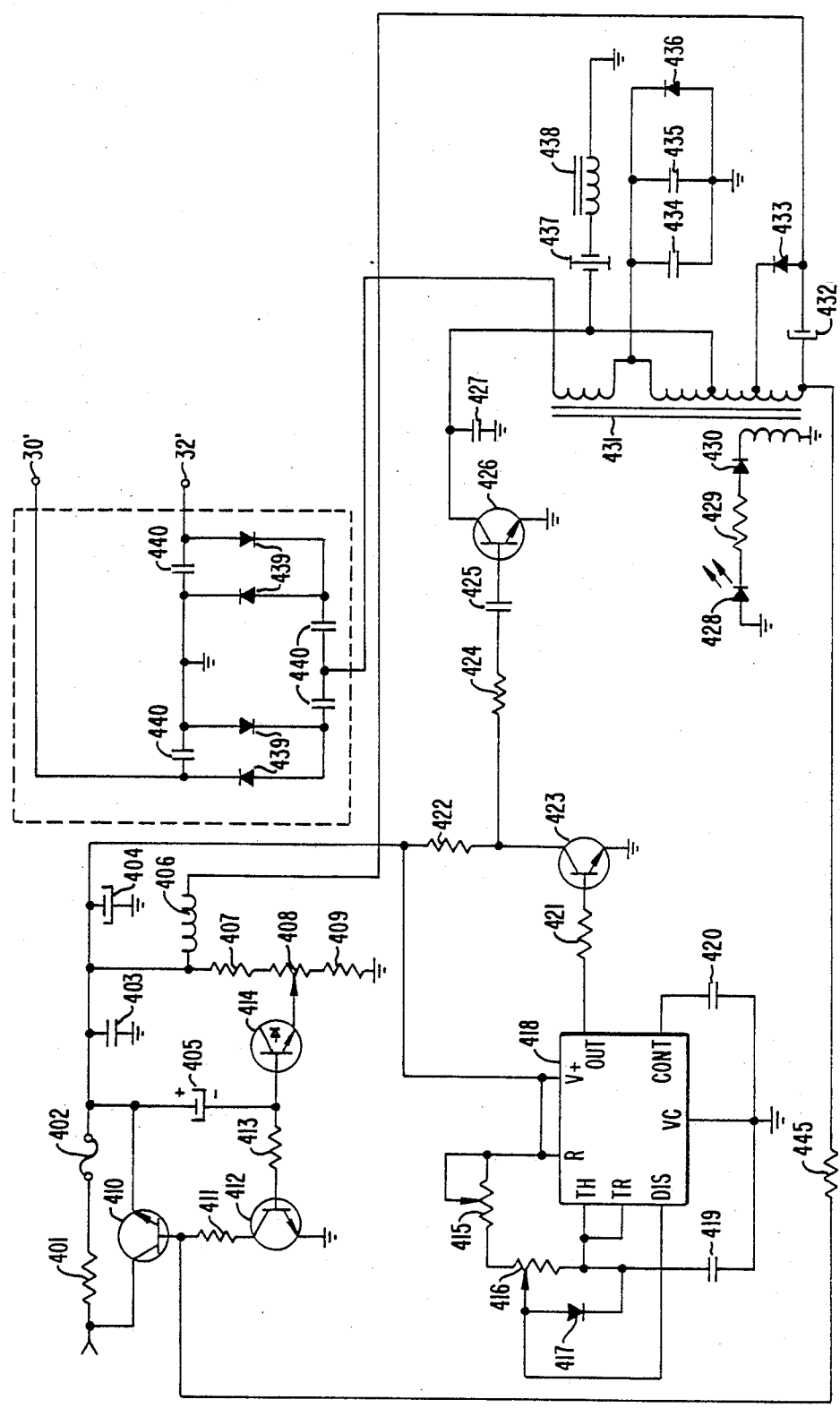
FIG._10.

ELECTROKINETIC TRANSDUCING METHODS AND APPARATUS AND SYSTEMS COMPRISING OR UTILIZING THE SAME

CROSS-REFERENCE TO RELATED APPLICATION

This is a continuation-in-part of pending U.S. patent application No. 06/838,400, filed Mar. 6, 1986, which is a continuation of U.S. patent application No. 06/127,646, filed Mar. 6, 1980, both now abandoned.

BACKGROUND OF THE INVENTION

1. Field Of The Invention

The present invention relates to electrokinetic transducing methods and apparatus, and more particularly to improvements in such apparatus and methods whereby the undesired production of ozone is decreased and efficiency is increased.

2. Prior Art

Electrokinetic transducers and apparatus and systems comprising the same have been known for many years. For example, electrokinetic transducers of the "diode" or "two-array" type, and systems comprising the same, are disclosed in U.S. Pat. No. 3,018,394, issued to Thomas Townsend Brown on Jan. 23, 1962, and in U.S. Pat. No. 2,949,550, issued to Thomas Townsend Brown on Aug. 16, 1960. Further, electrokinetic transducers of the "triode" or "three-array" type, and systems comprising the same, are disclosed in U.S. Pat. No. 3,518,462, issued to Thomas Townsend Brown on June 30, 1970.

The electrokinetic transducers of these prior art patents, when immersed in ionizable dielectric fluid media, e.g., air, convert electrical energy directly into fluid flow, i.e., flow of the ionizable dielectric fluid media, without the aid of moving parts. The first two patents cited above, for example, disclose electrokinetic apparatus wherein electrodes of appropriate form are maintained in predetermined juxtaposition in an ionizable dielectric fluid medium, e.g., air, and the application of suitable voltages to said electrodes, i.e., the excitation of said electrodes, produces forces which cause the medium to move with respect to said electrodes.

The prior art teaches that such electrokinetic apparatus may be used as an electric fan, when the exciting voltage applied to said electrodes is continuous, direct-current voltage, or may be used as a loudspeaker, when the exciting direct-current voltage applied to said electrodes is modulated in accordance with the desired sound output from the loudspeaker.

Unfortunately, while these prior art electrokinetic transducers have generally served the purposes for which they were constructed, when they are operated in air they often incidentally produce undesirably large quantities of ozone and oxides of nitrogen. Further, these prior art electrokinetic transducers, when operated as loudspeakers, have not only propogated sound waves but also have acted as fans, and produced greater airflows than are desirable in loudspeakers.

SUMMARY OF THE INVENTION

It is accordingly an object of the invention to provide improved electrokinetic transducers in which the level of incidentally produced ozone and oxides of nitrogen are less than the maximum permitted by the public health and safety laws and regulations, and less than is perceptible to most human users.

It is a further object of the invention to provide electrokinetic loudspeakers in which the ratio of airflow produced to sound energy produced is much smaller than has been attained in the prior art, without resorting to complex and costly "push-pull" arrangements.

It is an additional object of the invention to provide electrokinetic loudspeakers the sound radiation patterns of which are broader than the sound radiation patterns of prior art electrokinetic loudspeakers.

It is another object of the invention to provide electrokinetic fans which are capable of moving much greater volumes of air per unit of energy than the well-known rotary electric fans, while at the same time producing no more ozone or oxides of nitrogen than permitted by the public health and safety laws and regulations.

It is yet another object of the invention to provide electrokinetic ion generators which produce airflows containing substantial concentrations of air anions or negative air ions.

It is an additional object of the invention to provide electrokinetic apparata which emit substantial airflows while at the same time serving as electrostatic precipitators, and thus are much more efficient and quieter than conventional electrostatic precipitators which comprise rotary electric fans.

Other objects of the invention will in part be obvious and will in part appear hereinafter.

A principle feature of the invention is an improved electrode array geometry for diode-type electrokinetic transducers. Two electrode arrays confront each other across a space containing an ionizable medium (e.g. air). One electrode array comprises electrodes having a cross-sectional area greater than the cross-sectional area of the electrodes of the other electrode array. The distance between any two adjacent electrodes is the same for both electrode arrays. Any electrode in one array is substantially equidistant from the two nearest electrodes in the other array. The loci of the respective arrays (surfaces dissecting the cross-sections of all of the electrodes in an array) are substantially equidistant, i.e., the minimum distance between the loci is the same at all points.

Another principal feature of the invention is the waveform of the exciting voltage applied to the electrode arrays of diode-type electrokinetic transducers. Such waveforms are not continuous direct-current voltages but rather are voltage pulses of a single polarity, biased by a constant DC voltage. The leading edge of each voltage pulse may be contoured in such manner as to reduce the peak current and subsequent amount of ozone emitted by the transducer below that emitted when constant voltage or rectangular voltage pulse excitation are applied. For loudspeakers, the widths and/or amplitudes of the individual pulses may be varied in accordance with an audio signal to produce the desired sound output.

In accordance with another feature of the invention the electrode arrays of electrokinetic loudspeakers are so shaped as to produce desired sound radiation patterns.

The above and other objects and advantages of the invention will become apparent from the following detailed description, when taken in conjunction with the accompanying drawings of illustrative embodiments thereof.

BRIEF DESCRIPTION OF THE DRAWINGS

FIG. 1 is a schematic representation of an electrokinetic loudspeaker.

FIGS. 1A-1D pictorially illustrate the loudspeaker which is shown schematically in FIG. 1.

FIG. 2 is a schematic representation of an electrokinetic fan and negative ion generator.

FIG. 3 is a schematic representation of an electrostatic precipitator and fan.

FIGS. 4-6 represent an electrokinetic loudspeaker constructed in accordance with certain principles of the invention, which is characterized by a broad sound radiation pattern.

FIGS. 7A-7B illustrate prior art modes of exciting electrokinetic transducers.

FIG. 7C illustrates a pulsetrain for exciting electrokinetic transducers in accordance with certain teachings of the invention.

FIG. 7D illustrates a class of voltage pulse shapes particularly preferred for exciting electrokinetic transducers.

FIG. 7E illustrates a pulsetrain with pulses like those in FIG. 7D for exciting electrokinetic transducers.

FIG. 7F illustrates the preferred mode of exciting electrokinetic transducers which are adapted for use as electrostatic precipitators.

FIG. 8A is a schematic representation of an exciting voltage pulse generating circuit constructed in accordance with certain teachings of the invention.

FIG. 8B-8D show particular subcircuits which may be used in the circuit of FIG. 8A.

FIG. 9 is a block diagram of an exciting circuit for use with an electrostatic precipitator.

FIG. 10 is a schematic representation of an exciting circuit for use with an electrostatic precipitator.

DESCRIPTION OF THE PREFERRED EMBODIMENTS

FIG. 1 is a schematic representation of an electrokinetic loudspeaker 10 and an associated exciting circuit 12. Loudspeaker 10 embodies the preferred geometric arrangement of electrodes of electrokinetic transducers according to the present invention. A particular structural embodiment of loudspeaker 10 is shown in FIGS. 1A-1D and will be discussed in connection therewith.

Referring now to FIG. 1, loudspeaker 10 comprises two arrays of electrodes, array 14 and array 16, and an exciting circuit 12. Arrays 14 and 16 confront each other across a space containing an ionizable medium, e.g., air. Each individual electrode of array 14 is an elongated conductive member 14' (extending perpendicular to the plane of the drawing). Each individual electrode of array 16 is an elongated conductive member 16' (also extending perpendicular to the plane of the drawing). The number of electrodes shown in the drawings is limited for clarity of illustration; in many embodiments of the invention the number of electrodes in each array may be greater than is shown.

The electrodes 14' of array 14 all have substantially the same cross-sectional area and the electrodes 16' of array all have substantially the same cross-sectional area. Electrodes 14' of array 14 are of a relatively small cross-sectional area relative to electrodes 16' of array 16. (The cross-section referred to herein is the smallest cross-section of an electrode, i.e., the cross-section taken perpendicular to the major dimension of the electrode.)

In order to distinguish between the relatively small cross-section electrodes of array 14 and the relatively large cross-section electrodes of array 16, the electrodes of smaller cross-sections will sometimes be referred to herein as "minisectional" electrodes and the electrodes of larger cross-section will sometimes be referred to as "maxisectional" electrodes.

As seen in FIG. 1, all of the cross-sections of the electrodes of array 14 are dissected by a plane 24 and all of the cross-sections of the electrodes of array 16 are dissected by a plane 26. Planes 24 and 26 are equidistant in the sense that the distance between these two planes along any normal to both planes is equal to the distance between them along any other normal to both planes. In other words, in the simple planar array embodiment shown in FIG. 1, planes 24 and 26 are parallel. Surfaces like planes 24 and 26, which dissect all of the cross-sections of all of the electrodes of an array will sometimes be referred to herein as the "loci" of those respective arrays. As will be seen in connection with FIGS. 4-6 herein, the loci of the electrode arrays in certain embodiments of the present invention are not planar. In these embodiments, however like the planar embodiments of FIGS. 1 and 3, the electrode array loci are substantially equidistant, i.e., the minimum distance between the loci is the same at all points.

In this embodiment, the cross-sections of maxisectional electrodes 16' are circular or substantially circular. In electrokinetic loudspeakers this results in greatly reduced air flow while simultaneously providing considerably increased sound output.

In the embodiment of FIG. 1, the minimum distance A between surfaces tangent to the respective electrode arrays, or "interarray distance" is approximately 0.75 inches. The center-to-center distance B between any two adjacent electrodes of the same kind, or interelectrode distance, is approximately 0.50 inches. The maximum cross-sectional dimension C of one of the maxisectional electrodes is approximately equivalent to the diameter of a number 16 A.W.G. conductor. i.e., approximately 0.05 inches. Each electrode is approximately 12 inches long and the distance between the outer electrodes of each array is approximately 12 inches. It will be understood, however, that these dimensions are merely illustrative, and will be adapted to the characteristics of a particular exciting circuit, and to the practical considerations of a particular application. It is the ratios and geometric relations described herein that are significant for practicing the invention. For example, the ratio A/C (or electrode scale ratio) in this embodiment is approximately 15, and, for the electrokinetic loudspeaker, is always greater than unity.

In FIG. 1, the distance from any minisectional electrode to the nearest maxisectional electrode is designated as D. Any minisectional electrodes is substantially equidistant from the two closest maxisectional electrodes. This is in contrast with the electrode arrangements of U.S. Pat. No. 3,018,394 in which each minisectional electrode lies between the planes containing the opposite faces of its associated maxisectional electrode. Further, it is preferred that interelectrode distance B and dimension D be selected such that B is greater than or equal to D/2, and less than or equal to 2D. For some applications, B is equal to D, forming an equilateral triangle.

The electrode array geometries described herein are diodes; that is, the velocities of the ions in the space between the arrays is substantially unaffected by voltages on any other electrodes of the transducer. This is in contrast to the triode-type geometry disclosed in U.S. Pat. No. 3,518,462, issued to Thomas Townsend Brown on June 30, 1970.

Electrode arrays 14 and 16 are coupled to exciting circuit 12 as follows. Dual voltage supply conductors 14″ couple common positive supply busses 14‴ to each electrode 14′. Common negative supply bus 16″ is coupled to each electrode 16′ through an anti-corona resistor 18 (20-60 megohms in this embodiment). Busses 14‴ and 16″ are connected to exciting circuit 12 at the associated terminals by means of connectors 30 and 32. Lead 17 extends from common negative supply bus 16″ to socket 32′ of connector 32. Lead 15 extends from common positive supply bus 14″ to socket 30′ of connector 30. It is to be understood however that the present invention is not limited to the electrode polarities indicated in the present embodiment. Some embodiments of the present invention operate when the polarity of the applied exciting voltage is opposite to that shown in the present embodiment.

Exciting circuit 12 is one of the circuits shown and described below with reference to FIGS. 8A-8D, 9 and 10.

Referring to FIGS. 1A-1D, a structural embodiment of loudspeaker 10 includes frame 20 for maintaining electrode arrays 14 and 16 in the particular juxtaposition shown therein and described above. Frame 20 is preferably formed from insulating material of high dielectric strength. It is to be understood however that frame 20 is merely illustrative and that many support means for maintaining arrays 14 and 16 in operative mutually insulated juxtaposition may be provided. (Conductors 14″ shown in FIG. 1 are included for clarity of illustration only; no equivalent elements are found in the structure of FIGS. 1A-1D).

Referring now to FIG. 2, there is shown an electrode array pair configuration suitable for use in an improved air ion generator embodying certain teachings of the present invention. The electrode array pair configuration of FIG. 2 comprises a minisectional electrode array 50 consisting of at least three minisectional electrodes 50′, and a maxisectional array 52 consisting of at least four maxisectional electrodes 52′. Each maxisectional electrode 52′ is of generally teardrop cross-sectional shape, terminating in a sharp edge 53. A copious supply of negative air ions is produced at each of the sharp edges 53 when electrode arrays 50 and 52 are suitably excited to produce substantial air flow in the direction of arrows 55. This embodiment of a negative air ion generator is in other respects similar to the embodiment of the speaker in FIG. 1. Any minisectional electrode is substantially equidistant from the two nearest maxisectional electrodes. Electrodes 50′ are connected together by means of a common bus and this common bus is in turn connected via connector 30 to the positive terminal of a suitable exciting circuit 12 such as one of those described below with reference to FIGS. 8A-D. Each electrode 52′ is connected via an associated anti-corona resistor to a common negative supply bus which is in turn connected via connector 32 to the negative terminal of said exciting circuit. This negative air ion generator not only generates the negative air ions but also propels them to remote parts of the room in which it is located.

Referring now to FIG. 3, there is shown an electrode array pair configuration suitable for use in electric fans and precipitators embodying this invention. Such electric fans and precipitators are characterized by very high efficiency as compared with conventional rotary electric fans and electrostatic precipitators, while producing less ozone than the maximum limits set by health and safety laws and regulations. Maxisectional electrodes 58′ are elongated to increase the collection area for electrostatic precipitation. Minisectional electrodes 60′ are substantially identical to electrodes 14′ of FIG. 1. In this example, interarray distance A equals interelectrode distance B. (In general, B is greater than D/2 and less than 2D, as described above).

The embodiment of FIG. 3 is in other respects similar to the embodiment of FIG. 1. Each minisectional electrode is substantially equidistant from the two nearest maxisectional electrodes. Electrodes 60′ are connected together by means of a common bus and this bus is connected via connector 30 to the positive terminal of a suitable exciting circuit 12 such as one of those described below with reference to FIGS. 8A-8D, 9 and 10. Electrodes 58′ are connected via an anti-corona resistor to a common negative supply bus which is in turn connected via connector 32 to the negative terminal of the exciting circuit. The electrode and electrode support structure is substantially the same as the structure shown in FIGS. 1A-1D.

As seen in FIG. 3, the electrostatic precipitator and fan may further comprise an additional array 62 of passive collector electrodes 62′, positioned midway between each pair of maxisectional electrodes. In the embodiment shown in FIG. 3, the maximum cross-sectional dimension E of electrodes 62′ is approximately one-half of the maximum cross-sectional dimension F of electrodes 58′. Electrodes 62′ are grounded via a common bus and are particularly effective when used with the exciting circuit described below with reference to FIGS. 9 and 10. It will be understood, however, that this third array is not required for effective operation of the electrostatic precipitator described herein, but it does increase precipitation efficiency and reduce the release of anions in the environment. Array 62 can be located as shown in FIG. 3, or it can be located further downstream from array 58.

Referring now to FIGS. 4-6, there is shown a wide angle electrokinetic loudspeaker 70 which provides sound output over a large solid angle. (The planar electrokinetic loudspeaker of the kind shown in FIGS. 1 and 1A-1D emits a beam of sound the cross-section of which, at least in the immediate vicinity of the loudspeaker is substantially the shape and area of the electrode arrays.) Wide angle loudspeaker 70 comprises two electrode arrays, 72 and 74. Electrode array 72 consists of five maxisectional electrodes 72′ and electrode array 74 consists of four minisectional electrodes 74′. (A substantially larger number of electrodes of each kind may be used in certain working embodiments of the invention.) Electrodes 72′ of electrode array 72 and electrodes 74′ of electrode array 74 are all supported on a frame 76 and a plurality of stays 78, 80, 82, 84, which are affixed to frame 76. Minisectional electrodes 74′ are affixed to each stay at the junction points 96, 98, etc. Frame 76 comprises a top member 86, a bottom member 88, a left-side member 90 and a right-side member 92. These four main members of frame 76 are joined together to rigidly maintain them in the juxtaposition shown in FIGS. 4-6.

Each one of the stays 78, 80, 82, 84 is affixed at its end to the side members 90 and 92 of frame 76, maintaining these stays in the juxtaposition shown in FIGS. 4-6 and in the relation to frame 76 shown in the figures. The back face 94 of frame 76 is open and the front face 95 of frame 76 is blocked only by electrodes 72', electrodes 74', and stays 78, 80, 82, 84.

Loudspeaker 70 does not include the usual diaphragm or any other element which prevents passage of air or ionized gas through frame 76. (Loudspeaker 70 may of course be disposed in a suitable cabinet, the opening or openings of which are covered with grill cloth in a well-known manner.)

The loci of the electrode arrays 72 and 74 of loudspeaker 70 are compound-curved, three dimensional figures. (Not shown.) The loci of electrode array 72 and 74 are substantially parallel, i.e., the minimum distance from any point on either locus to the other locus is substantially the same for any point of either locus.

Minisectional electrodes 74' are electrically interconnected by conductors 102 and a suitable lead 104 is provided whereby all of the minisectional electrodes can be commonly connected to an associated exciting circuit. Each maxisectional electrode 72' is connected to a common bus 110 by way of an associated anticorona resistor. Anti-resistors 112, 114, 116, 118 and 120 may be 20–60 megohm resistors rated at 2.5 watts. Common bus 110 is provided with the lead 124 by which it can be connected to a suitable exciting circuit.

Loudspeaker 70 of FIG. 4–6 may be excited by means of an exciting circuit such as one of the circuits discussed in connection with FIGS. 7A–7E, and 8A–8D below.

Lead 104 may be provided with a jack 30' of the kind shown in FIG. 1 and lead 124 may be provided with a jack 32' of the kind shown in FIG. 1. The exciting circuit may thus easily be plugged into jacks 30' and 32'.

Referring now to FIGS. 7A and 7B, the principal prior art modes of exciting diode type electrokinetic transducers are shown. As shown in FIG. 7A, unmodulated diode type electrokinetic transducers, e.g., fans, are excited by a means of a continuous, substantially unvarying direct current voltage such as voltage VE represented by horizontal line 150 in FIG. 7A, applied between the minisectional and maxisectional electrode arrays of the unmodulated electrokinetic transducers. Modulated diode type electrokinetic transducers, such a loudspeakers, are excited by means of direct current voltages which are modulated in amplitude in accordance with the sound patterns to be produced by the loudspeakers, e.g., by waveform 154 of FIG. 7B. These modulated direct current voltages are applied between the two electrode arrays.

Referring now to FIG. 7C, 7D and 7E, the modes of exciting a diode type electrokinetic transducer in accord with the principal features of the present invention are shown. Referring first to FIG. 7C, voltage wavetrain 160 (solid line) is a rectangular voltage pulse wavetrain for exciting unmodulated diode type electrokinetic transducers, such as fans, negative ion generators, and electrostatic precipitators. This wavetrain is applied is the positive supply bus via connector 30, and the negative supply bus is grounded. Rectangular voltage pulse wavetrain generators suitable for practicing the present invention are well-known in the art. In the preferred embodiment a duty cycle of 20–80 percent is used, and a pulse repetition rate of 15,000–22,500 pulses per second. Rectangular voltage pulse wavetrain 160 is symmetrically distributed about a baseline 162 which corresponds to a direct current bias voltage, the magnitude of which is indicated by the length of arrow 170 in FIG. 7C. At no time does the voltage pulse wavetrain 160 drop to the zero voltage reference level (ground) 168. In the preferred embodiment the voltage of the maximum peaks 164 of wavetrain 160 is approximately 8.0 kilovolts, and the maximum peak 166 is approximately 3.5 kilovolts. The direct current bias voltage 170 is about 5.75 kilovolts.

In another typical embodiment, maximum peaks 164 of wavetrain 160 are 18 kilovolts, minimum peaks 166 are 6 kilovolts, and the direct current bias voltage is 12 kilovolts. In both examples the rectangular voltage pulse wavetrain 160 is symmetrically distributed about DC bias baseline 162, which is located equidistant from the maximum peaks 164 and minimum peaks 166 of wavetrain 160. The pulse amplitude of the first example is approximately 4.5 kilovolts and the pulse amplitude of the second example is approximately 12 kilovolts. The pulse amplitude of the preferred voltage wavetrain for any particular embodiment of the invention is determined in accordance with the operating conditions of the particular electrokinetic transducer electrode array pair. One preferred mode of selecting the pulse amplitude of voltage wavetrain 160 is by monitoring the ion density in the interarray space of the excited electrokinetic transducer. By proper selection of the amplitude of voltage wavetrain 160 this ion density can be maintained substantially continuous, with small variations only, even during the pulse interval, i.e., during the time when the voltage of the wavetrain is at the level of the minimum peaks 166.

In general, the pulse amplitude, pulse width, pulse frequency, duty cycle and pre-bias level are all parameters that may be orchestrated to achieve the desired ion density and dielectric pressure variations for a particular application of the invention. Furthermore, as the interarray distance is increased, one or more of these parameters should be proportionally adjusted.

This excitation mode (pulsetrains) may also be applied to modulated diode type electrokinetic transducers, such as the loudspeaker electrode array pair of FIGS. 1A–1D, or the loudspeaker electrode array pair of FIGS. 4–6. For example, the width of each pulse may be varied in accordance with the corresponding instantaneous magnitude (or sample magnitude) of the audio signal to be acoustically reproduced by the loudspeaker. This pulse width modulation is illustrated in FIG. 7C by wavetrain 160' shown with vertical-trailing edges 172', 174', 176'. The displacement of each trailing edge of wavetrain 160' from the time-position of its corresponding unmodulated pulse trailing edge is determined in accordance with the amplitude of a corresponding sample of the audio signal which is to be reproduced in acoustic form by the loudspeaker. Such pulse width modulation techniques are well-known in the electronic arts.

Alternatively, the pulses of wavetrain 160 may be varied in amplitude in accordance with the corresponding instantaneous magnitude or sample magnitudes of an audio signal as seen in FIG. 7C, where the dashed lines 172", 174", 176" represent the peaks of the respective pulses of wavetrain 160 when its pulses are varied in amplitude in accordance with one audio voltage or current signal. Such amplitude modulation techniques are also well-known in the electronic arts. Simultaneous pulse width modulation and amplitude modulation, or frequency modulation, in accordance with an audio signal representing the sound pattern to be reproduced are also possible.

Referring now to FIG. 7D, there is shown an idealized representation of a single pulse 180 of a voltage pulse wavetrain for use in exciting the electrode array pairs of diode type electrokinetic transducers in accordance with the present invention. Pulse 180 is generally characterized by a curved leading edge 182, a substantially flat top or peak 184 and a substantially straight, substantially vertical trailing edge 186. Leading edge 182 preferably blends smoothly into flat top 184 at a knee location 188. Although trailing edge 186 forms a sharp angular knee 190 with peak 184, the presence of a sharp angular knee 190 is not critical to the successful application of this aspect of the invention, and pulse 184 and trailing edge 186 may be joined by a curved knee. Furthermore, trailing edge 186 need not be straight but rather may follow in whole or in part an approximation to an RC discharge curve, such as the dashed curve 192 of FIG. 7D.

In a practical embodiment, a train of pulses, each of which is a useful approximation to the overall shape of pulse 180, may be derived from a circuit with poor high-frequency response to which is applied a rectangular voltage wave pulsetrain. Preferably, in generating a pulsetrain having individual pulses which are an even better approximation to pulse 180, this degraded rectangular wave will be clipped at its zero symmetry baseline (194, FIG. 7D) to remove all negative pulses. resulting in a pulsetrain of the kind shown in FIG. 7E.

A very large part of the ozone generated during the excitation of electrokinetic transducers by square voltage waves such as those shown in FIG. 7C, takes place in the shaded area 196 shown in FIG. 7D; this excess ozone generation can be avoided by using excitation voltage pulses which are in general like pulse 180, i.e., which do not include area 196.

Ideally, the shape of the leading edge of the preferred form of exciting voltage pulse should be determined in accordance with the natural rise characteristic of ion current in the interelectrode space of the excited electrode array pair, so that no ions are excessively accelerated due to the application of unduly large instantaneous voltages, which would tend to produce excess quantities of ozone.

Pulses with ideally shaped leading edges may be generated by means of pulse formers well-known in the art. However, in order to achieve substantial reduction of ozone production it is not necessary to make use of pulses having leading edges which approximate the ideal leading edge more closely than do the leading edges of degraded rectangular wave pulses discussed above.

Referring now to FIG. 7E, there is shown a voltage pulse wavetrain or pulsetrain 200 which consists of a series of pulses, 202, 204, 206, etc., each of which has approximately the shape of pulse 180 of FIG. 7D. Unmodulated diode type electrokinetic transducers may be excited by means of voltage pulsetrains like the solid line voltage pulsetrain 200 of FIG. 7E, wherein all of the pulses are of equal width. These pulses may be modulated for use in modulated diode type electrokinetic transducers in a manner analogous to the modulation discussed above with reference to FIG. 7C. Thus, the widths of the individual pulses of pulsetrain 200 may be varied in accordance with the magnitudes of successive samples of an audio signal, as indicated by the dashed line trailing edges 202', 204', 206' shown in FIG. 7E, thereby reproducing said audio signal in acoustic form. Similarly, the amplitudes of the individual pulses of exciting voltage pulsetrain 200 may be modulated in accordance with the magnitudes of successive samples of an audio signal, as indicated by the dashed lines 202'', 204'', 206'' of FIG. 7E. The resulting amplitude modulated or pulse width modulated voltage pulsetrain may be used to excite the electrode array pair of diode type electrokinetic loudspeakers such as the electrokinetic loudspeaker of FIG. 1.

As further seen in FIG. 7E, the baseline 207 of exciting voltage pulsetrain 200 is offset from the zero voltage reference level 210 by a direct current bias voltage 208, so that the exciting voltage does not drop to or cross the zero voltage line.

Referring now to FIG. 7F, a pair of waveforms 212 and 214 are shown. These waveforms are applied to the opposite terminals of a diode-type electrokinetic transducer used as an electrostatic precipitator, whereby the precipitation efficiency is increased without decreasing airflow. Waveform 212 is similar to pulsetrain 200 of FIG. 7E, comprising contoured, positive pulses with a baseline offset from the zero voltage reference level (ground) by a positive direct current bias voltage 216. In this embodiment, the positive direct current bias voltage is 6 kilovolts and the peak positive voltage is 12 kilovolts (relative to ground). Waveform 214 is a periodic negative ramp voltage offset by a negative direct current bias voltage. In this embodiment, the negative direct current bias voltage is −4 kilovolts and the peak negative voltage is −10 kilovolts (relative to ground). The ramping of waveform 214 begins at a predefined time interval T after the trailing edge of each positive pulse in pulsetrain 212, and returns to the negative baseline voltage before the leading edge of each positive pulse.

A circuit for generating waveforms 212 and 214, such as the circuit described below with reference to FIGS. 9 and 10, may be utilized as the exciting circuit 12 in an electrokinetic transducer such as that shown in FIG. 3. Waveform 212 is applied to the minisectional electrodes via connector 30 and waveform 214 is applied to the maxisectional electrodes via connector 32.

In operation, positively charged ions are generated during the duty cycle of pulsetrain 212. The ionized dielectric medium includes air (nitrogen and oxygen) and undesirable particulates of pollution (e.g. smoke, dust, dirt). Both types of positive ions will move in the direction of the arrow in FIG. 3 (from the minisectional electrode array towards the maxisectional electrode array). The air molecules, being much lighter than the particulates, will accelerate at a greater rate. Many of these air molecules will escape past the maxisectional electrode array before the negative ramp voltage is applied to that array (parameter T being selected to achieve this result), and virtually all of the air molecules will escape by the time the negative ramp voltage reaches its negative peak. The heavier positively-charged molecules will, however, lag behind and be drawn to the strong negative potential applied to the maxisectional electrodes. Precipitation of undesirable particulates is thus increased without decreasing the movement of air.

As a further refinement of this approach, multiple collector arrays may be used downstream from the single maxisectional array described above. By applying appropriately delayed negative ramps or pulses of decreasing amplitude to each collector array, the precipitation efficiency can be further increased without decreasing the flow of air.

It is well within the scope of those having ordinary skill in the electronic arts to provide many exciting circuits for generating the voltage wavetrains of the kind described above in connection with FIGS. 7C–7F. One such exciting pulsetrain generating device adapted for generating a pulse width modulated version of voltage pulsetrain 200 (FIG. 7E) is shown schematically in FIG. 8A. Exciting voltage pulsetrain generator 220 comprises a pulse width modulator 222, a pulse shaper 224, a clipping circuit 226, a high voltage transformer 228, and a high voltage power supply 230. Pulse width modulator 222 comprises an input terminal 232 to which is applied an audio frequency electrical signal, the acoustic equivalent of which is to be emitted by the electrokinetic loudspeaker connected to the output terminals 30" and 32" of high voltage power supply 230.

Pulse width modulator 222 may be any one of a number of pulse width modulator circuits well-known in the art, adapted to generator circuit 220. Pulse width modulator 222 produces on its output terminal 235 a train of rectangular or low voltage pulses the widths of which vary in accordance with the magnitudes of sequentially taken samples of the audio frequency electric signal applied to input terminal 232. A circuit which may be used as the circuit of pulse width modulator 222 is shown in FIG. 8B and will be discussed in connection therewith.

Pulse shaper 224 may be any one of a number of differentiating circuits well-known in the art for the purpose of converting rectangular pulses of the shape indicated in FIG. 7C to corresponding pulses of the preferred shape shown in FIG. 7E. See, for example, pages 128–133 of Electron-Tube Circuits, by Samuel Seely, McGraw-Hill Book Company, Inc., 1950. See, also, Basic Pulses, by I. Gottlieb, published by John F. Rider Publishers, New York, N.Y., 1958.

As a result of the operation of pulse shaper 224, a low voltage pulsetrain signal will be produced at output terminal 236 of pulse shaper 224. Each individual pulse of the pulsetrain signal produced at output terminal 236 will correspond to one of the pulses of the rectangular pulsetrain signal occurring on input terminal 235. Each individual pulse of pulsetrain signal occurring on output terminal 236 will be proportional in width to the corresponding pulse of the rectangular pulse wavetrain occurring on input terminal 235, i.e., the pulsetrain occurring at output terminal 236 will be pulse width modulated in the same manner as the rectangular pulse wavetrain occurring at input terminal 235. However, each of the pulses of the pulsetrain signal on output terminal 236 will be shaped substantially like the pulses shown in FIGS. 7D and 7E.

Clipping circuit 226 serves to clip the generally half wave symmetrical pulsetrain produced at terminal 236 and supplied to the base of transistor 238 via resistor 237, eliminating the negative pulses, so that the signal produced on the collector lead 240 of transistor 239 is a pulse width modulated halfwave signal of the kind illustrated in FIG. 7E (the pulses of which have vertical, dashed line trailing edges). In this embodiment, transistor 238 is a 2N3906 transistor, resistor 237 is a 100 ohm limiting resistor, and transistor 239 is a 2N3055 transistor. High voltage transformer 228 may be toroidal high voltage audio transformer of well-known type, breakdown rated at 20 kilovolts with a center frequency of 30 kilohertz. High voltage power supply 230 may be a cascade multiplier of well-known type comprised of high voltage, low capacitance capacitors and fast switching diodes.

The turns ratio of high voltage audio transformer 228 and the circuit parameters of high voltage power supply 230 may be selected by those of ordinary skill in the art so that the output voltages produced across output terminal 30" and 32", i.e., the maximum and minimum peak voltages, are the maximum and minimum exciting voltages for which the associated electrode array pair is designed.

The waveform of the voltage across output terminals 30" and 32" will be substantially like the pulse width modulated waveform shown in FIG. 7E, with the widths of the succeeding pulses varying in accordance with the audio input signal at terminal 232.

Referring now to FIG. 8B, there is shown a pulse width modulation circuit 250 which may be used as circuit of pulse modulator 222 of FIG. 8A. The integrated circuit 252 of FIG. 8B is a well-known integrated circuit identified by the designation NE555. Capacitor 254 is a 0.1 microfarad capacitor and tunable capacitor 256 is tunable over a range of capacitance values ranging from 0.001 microfarads to 0.01 microfarads. Typically, at the 0.001 microfarad setting of tuning capacitor 256 the pulse repetition rate of the rectangular pulse wavetrain produced at output terminal 235 will be about 15,000–22,500 pulses per second. Diodes 258 and 260 are 1N914 solid state diodes, and resistor 262 is a 2.2 kilohm, half-watt resistor. Capacitor 266 is a 0.1 microfarad capacitor. Transistor 263 is a 2N2222 transistor and transistor 264 is a 500 ohm 0.25 resistor. The selection of other parameters of the circuit of FIG. 8B, such as the supply voltage, is well within the skill of one of ordinary skill in the art.

Referring now to FIG. 8C, there is shown a pulse shaping circuit 270 which may be used as the circuit of pulse shaper 224 in FIG. 8A. This circuit will be recognized as the equivalent circuit of a tunable oscilloscope probe. Such a circuit when detuned by making the capacitance value of capacitor 272 much smaller than the capacitance value of capacitor 276, degrades a rectangular wave received at input terminal 235 by rounding off the knee following the leading edge of each pulse, thus producing a half wave symmetrical pulsetrain at output 236, the individual pulses of which are shaped generally like the pulses shown in FIG. 7D and 7E. The selection of suitable values for capacitor 272 and 276 and resistors 274 and 278 is well within the scope of one of ordinary skill in the art.

The circuit of FIG. 8A can be modified by those having ordinary skill in the art to produce excitation voltage pulsetrains of the type shown in FIG. 7C and described in connection therewith, or the type shown in FIG. 7E and described in connection therewith, for suitably exciting, in accordance with the principles of this invention, any electrokinetic transducer of the prior art, or any electrokinetic transducer incorporating the electrode array pair structure disclosed hereinabove in connection with FIGS. 1A–1D, 2, 3, 3A and 4–6. When it is desired to provide an excitation pulsetrain for an unmodulated electrokinetic transducer. e.g., fan, negative air ion generator, or electrostatic precipitator, pulse width modulator 222 may be eliminated and replaced with a fixed width pulse generator. Where it is unnecessary to take advantage of the ozone reduction advantage and efficiency advantage of the excitation voltage pulse shape of 7D and 7E, pulse shaper 224 may be replaced by a shunt connection between terminals 235 and 236, thereby generating pulses of the type shown in FIG. 7C.

Further, in certain economically uncritical applications, the part of circuit 220 to the right of terminal 236 may be replaced by a circuit of the kind shown in FIG. 8D, in which transistor 280 is a high voltage transistor of the kind used in cathode ray tube flyback circuits, having a beta of 100 or more and rated at 10 kilovolts or more, and resistor 282 and 284 are suitable high voltage resistors. When using the circuit of FIG. 8D, terminal 32" is connected to jack 32' of FIG. 1 and a high voltage direct current power supply is connected between jack 30' of FIG. 1 and ground, its positive terminal being connected to jack 30.

Referring to FIG. 9, a block diagram of a typical circuit 300 for generating the waveforms illustrated in FIG. 7F is shown. Circuit 300 is used as the exciting circuit 12 with the electrode configuration shown in FIG. 3. Circuit 300 comprises power supply 302, regulator filter 304, oscillator and driver circuit 306, amplifier and flyback transformer 308, and bipolar multiplier 310.

Referring to FIG. 10, a schematic representation of a circuit 400 for implementing the block diagram of FIG. 9 is shown. Terminals 30" and 32" are provided for connecting this circuit to sockets 301 and 32' of FIG. 3. A detailed specification of the circuit elements and their functions is provided herewith as Table 1. The delay T (FIG. 7F) is controlled by the RC time constant across oscillator 418.

TABLE 1

| PART | | FUNCTION |
|---|---|---|
| 401. | Resistor 15 ohm 5 watt | current limiting |
| 402. | Fuse 400 ma. fast acting 32 v | overload protect |
| 403. | Capacitor .1 µf 50 volt ceramic | bypass filter |
| 404. | Capacitor 1000 µf 35 volt electrolytic | power supply filter |
| 405. | Capacitor 22 µf 35 volt electrolytic | reference filter |
| 406. | Coil 27 µh | RFI filter |
| 407. | Resistor 390 ohm ½ watt carbon film | voltage divider |
| 408. | Potentiometer 500 ohm ½ watt carbon film | voltage divider |
| 409. | Resistor 1800 ohm ½ watt carbon film | voltage divider |
| 410. | Transistor 2SD130 NPN | voltage regulator |
| 411. | Resistor 330 ohm ½ watt carbon film | base bias |
| 412. | Transistor 2N2222NPN | regulator control |
| 413. | Resistor 47 ohm ¼ watt carbon film | base bias |
| 414. | Diode 9.1 volt zener ½ watt | bias control |
| 415. | Potentiometer 1 Megohm ¼ watt cermet | frequency adjust |
| 416. | Potentiometer 1 Megohm ¼ watt cermet | pulse width adjust |
| 417. | Diode 1N 4148 | frequency stabilizer |
| 418. | Integrated circuit LM 555 | oscillator circuit |
| 419. | Capacitor 470 pf 50 v mylar | timing capacitor |
| 420. | Capacitor .01 µf 50 v ceramic | reference capacitor |
| 421. | Resistor 330 ohm ½ watt carbon film | base bias |
| 422. | Resistor 56 ohm 1 watt carbon film | collector load |
| 423. | Transistor 2N2222A | drive amplifier |
| 424. | Resistor 10 ohm ½ watt carbon film | base bias |
| 425. | Capacitor 1 µf 25 volt mylar | coupling capacitor |
| 426. | Transistor 2SC508 NPN | final amplifier |
| 427. | Capacitor 390 pf 100 volt mylar | bypass/waveshaper |
| 428. | Diode, light emitting | H.V. on indicator |
| 429. | Resistor 75 ohm ¼ watt carbon film | current limiter |
| 430. | Diode 1N4001 | voltage rectifier |
| 431. | Transformer, Flyback 46-80384-3 | H.V. step up |
| 432. | Capacitor 220 µf 35 volt electrolytic | boost capacitor |
| 433. | Diode 1N3487 | boost rectifier |
| 434. | Capacitor .039 µf 400 volt ceramic | waveshaper |
| 435. | Capacitor 470 pf 400 volt mylar | waveshaper |
| 436. | Diode 1N3487 | damping rectifier |
| 437. | Capacitor 3.3 µf 250 volt bipolar | waveshaping cap |
| 438. | Coil (choke) 22 mh | waveshaping coil |
| 439. | Diode 10,000 volt M100S | H.V. multiplier |
| 440. | Capacitor .068 µf 10,000 volt ceramic | H.V. multiplier |

TABLE 1-continued

| PART | | FUNCTION |
|---|---|---|
| 441. | Resistor 180 ohm ¼ watt carbon film | current limiting |

In summary, the present invention provides both novel electrode array geometry for diode type electrokinetic transducers and a new type of exciting waveform for such transducers. Both of these aspects of the invention contribute to the efficient operation of the transducer and the reduction of incidentally produced ozone and oxides of nitrogen. It is to be understood, however, that certain changes may be made in the above constructions and the methods carried out thereby without departing from the scope of the present invention. For example, although the electrode arrays have been disclosed as comprising parallel mutually insulated conductors, one or more grid type electrode arrays may be used, either in substitution for or in addition to the disclosed arrays. These grids comprise intersecting non-mutually insulated electrodes. Accordingly, the scope of the present invention is not limited by the above description but is defined by the appended claims.

What is claimed is:

1. A diode-type electrokinetic transducer, comprising:
   a first array of electrodes;
   a second array of maxisectional electrodes the cross-sections of which are larger in area than the cross-sections of the electrodes in said first array of electrodes; and
   a source of exciting voltage connected in a circuit path between said first array of electrodes and said second array of electrodes for producing voltage pulses of a single polarity, the durations of which are less than the pulse intervals therebetween;
   said electrode arrays confronting each other across a space containing an ionizable medium, such that any electrode in said first array is substantially equidistant from the two closest electrodes in said second array.

2. An electrokinetic transducer as claimed in claim 1 wherein said voltage pulses are substantially rectangular pulses.

3. An electrokinetic transducer as claimed in claim 1 wherein said voltage pulses have curvilinear leading knees to minimize the production of ozone by said transducer.

4. An electrokinetic transducer as claimed in claim 1 wherein said voltage pulses are contoured in the manner indicated in FIG. 7D to minimize the production of ozone by said transducer.

5. An electrokinetic transducer as claimed in claim 1 wherein said voltage pulses are modulated in accordance with a modulating signal.

6. An electrokinetic transducer as claimed in claim 5 wherein said voltage pulses are pulse width modulated in accordance with said modulating signal.

7. An electrokinetic transducer as claimed in claim 5 wherein said voltage pulses are amplitude modulated in accordance with said modulating signal.

8. An electrokinetic transducer as claimed in claim 5 wherein said voltage pulses are frequency modulated in accordance with said modulating signal.

9. An electrokinetic transducer as claimed in claim 3 wherein said voltage pulses are modulated in accordance with a modulating signal.

10. An electrokinetic transducer as claimed in claim 9 wherein said voltage pulses are pulse width modulated in accordance with said modulating signal.

11. An electrokinetic transducer as claimed in claim 9 wherein said voltage pulses are amplitude modulated in accordance with said modulating signal.

12. An electrokinetic transducer as claimed in claim 9 wherein said voltage pulses are frequency modulated in accordance with said modulating signal.

13. An electrokinetic transducer as claimed in claim 1 in which the loci of said electrode arrays are curved.

14. An electrostatic precipitator comprising:
a first array of electrodes
a second array of electrodes, the electrodes in said second array having a cross-sectional area larger than the cross-sectional area of the electrodes in said first array;
said electrode arrays confronting each other across a space containing air;
a third array of electrodes coupled to a zero voltage reference level and disposed at least partially downstream from said second array of electrodes such that the minimum distance from any electrode in the third array to the nearest electrode in the first array is greater than the minimum distance from any electrode in the second array to the nearest electrode in the first array; and
generating means for generating a first signal comprising voltage pulses of a single polarity and for generating a second signal of an opposite polarity from said first signal, said generating means being coupled to said first array of electrodes for applying said first signal to said first array and being coupled to said second array of electrodes for applying said second signal;
said generating means including means for maintaining the absolute value of said first signal above a predetermined voltage and means for increasing the absolute value of said second signal during at least part of the interval between the voltage pulses of said first signal to collect heavier charged molecules.

15. The electrostatic precipitator of claim 14 wherein the distance between adjacent electrodes in said first array is substantially equal to the distance between adjacent electrodes in said second array.

16. The electrostatic precipitator of claim 14 wherein any electrode in said first array is substantially equidistant from the two closest electrodes in said second array.

17. The electrostatic precipitator of claim 14 wherein the second signal generated by said generating means is a periodic ramp signal with each ramp beginning at a predefined interval after the trailing edge of a voltage pulse in the first signal.

18. The electrostatic precipitator of claim 17 wherein said generating means maintains the absolute value of the voltage of said second signal above a second predetermined voltage.

19. An apparatus for moving air comprising:
a first array of electrodes;
a second array of electrdes, the electrodes of said second array having a cross-sectional area larger than the cross-sectional area of the electrodes in said first array;
the distance between any two adjacent electrodes in said first array being substantially equal to the distance between any two adjacent electrodes in said second array.
said electrode arrays confronting each other across a space containing air such that any electrode in said first array is substantially equidistant from the closest two electrodes in the second array; and
generating means coupled between said first array and said second array, for generating a signal comprising voltage pulses of a single polarity, said generating means including means for biasing said signal so that the absolute value of the voltage of said signal stays above a predetermined minimum value.

20. The apparatus of claim 19 wherein the distance from any electrode in said first array to the nearest electrode in said second array is substantially equal to the distance between any two adjacent electrodes in said second array.

21. The apparatus of claim 19 wherein the locus of the first array is parallel to the locus of the second array.

* * * * *

(12) REEXAMINATION CERTIFICATE (4718th)
United States Patent
Lee

(10) Number: US 4,789,801 C1
(45) Certificate Issued: Jan. 14, 2003

(54) ELECTROKINETIC TRANSDUCING METHODS AND APPARATUS AND SYSTEMS COMPRISING OR UTILIZING THE SAME

(75) Inventor: Jimmy L. Lee, Santa Rosa, CA (US)

(73) Assignee: Zenion Industries Inc., Rohnert Park, CA (US)

Reexamination Request:
No. 90/005,993, May 1, 2001

Reexamination Certificate for:
Patent No.: 4,789,801
Issued: Dec. 6, 1988
Appl. No.: 07/034,291
Filed: Apr. 3, 1987

Related U.S. Application Data

(63) Continuation-in-part of application No. 06/838,400, filed on Mar. 6, 1986, now abandoned, which is a continuation-in-part of application No. 06/127,646, filed on Mar. 6, 1980, now abandoned.

(51) Int. Cl.[7] .............. H02N 1/04; B03C 3/06; B03C 3/12
(52) U.S. Cl. .......... 310/308; 323/903; 361/235; 381/111; 96/26; 96/76
(58) Field of Search ............. 310/308; 96/26, 96/76, 25, 80; 313/307, 309, 238, 325, 326, 351; 323/903; 361/235; 381/111

(56) References Cited

U.S. PATENT DOCUMENTS

| | | | |
|---|---|---|---|
| 1,389,126 A | 8/1921 | Chubb | |
| 2,231,877 A | 2/1941 | Bennett | 175/363 |
| 2,239,694 A | 4/1941 | Bennett | 230/69 |
| 2,279,586 A | 4/1942 | Bennett | 230/69 |
| 2,327,588 A | 8/1943 | Bennett | 315/326 |
| 2,698,669 A | 1/1955 | Wintermute | 183/7 |
| 2,949,550 A | 8/1960 | Brown | 310/5 |
| 3,443,358 A | 5/1969 | Drenning et al. | 55/2 |
| 3,456,135 A | 7/1969 | Marks | 310/10 |
| 3,803,808 A | 4/1974 | Shibuya et al. | 55/123 |
| 3,816,980 A | 6/1974 | Schwab | 55/123 |
| 3,843,906 A | 10/1974 | Leibrecht | 317/4 |
| 3,892,927 A | 7/1975 | Lindenberg | 179/111 |
| 3,981,695 A | 9/1976 | Fuchs | 55/138 |
| 3,984,215 A | 10/1976 | Zucker | 55/2 |
| 3,985,524 A | 10/1976 | Masuda | 55/112 |
| 4,018,577 A | 4/1977 | Shibuya et al. | 55/137 |
| 4,038,583 A | 7/1977 | Breton | 361/230 |
| 4,126,434 A | 11/1978 | Keiichi | 55/137 |
| 4,138,233 A | 2/1979 | Masuda | 55/139 |
| 4,210,949 A | 7/1980 | Masuda | 361/226 |
| 4,231,766 A | 11/1980 | Spurgin | 55/138 |
| 4,232,355 A | 11/1980 | Finger et al. | 361/235 |
| 4,259,707 A | 3/1981 | Penney | 361/212 |
| 4,369,776 A | 1/1983 | Roberts | 128/200.14 |
| 4,377,839 A | 3/1983 | Blomgren, Jr. et al. | 361/233 |
| 4,643,745 A | 2/1987 | Sakakibara et al. | 55/137 |
| 4,689,056 A | 8/1987 | Noguchi et al. | 55/138 |
| 4,877,428 A | 10/1989 | Zorloni | 55/139 |

FOREIGN PATENT DOCUMENTS

| | | | |
|---|---|---|---|
| DE | 25 38 958 | 3/1977 | 55/177 |

*Primary Examiner*—Burton Mullins

(57) ABSTRACT

Electrokinetic transducing methods and systems are disclosed in which the two electrode arrays confront each other and each electrode in one array is equidistant from the two nearest electrodes in the other array. The electrode arrays are excited by pulsed exciting voltages, the individual pulses of which are preferably all negative or all positive, have durations equal to or less than the pulse intervals, and have rounded leading knees. Embodiments of the invention are disclosed for applications including electrokinetic loudspeakers, ion generators, fans, and electrostatic precipitators.

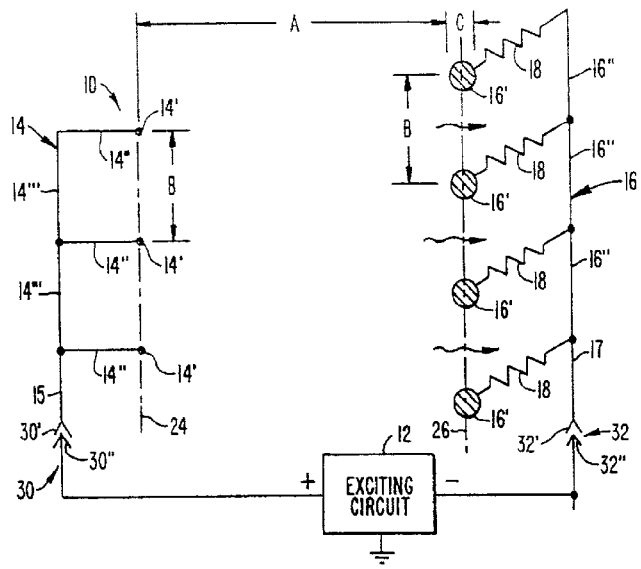

ures 1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14–18 is confirmed.

Claims 1 and 19 are determined to be patentable as amended.

Claims 2–13, 20 and 21, dependent on an amended claim, are determined to be patentable.

New claims 22–24 are added and determined to be patentable.

1. A diode-type electrokinetic transducer, comprising:
a first array of electrodes;
a second array of maxisectional electrodes the cross-sections of which are larger in area than the cross-sections of the electrodes in said first array of electrodes;
a source of exciting voltage connected in a circuit path between said first array of electrodes and said second array of electrodes for producing voltage pulses of a single polarity, the durations of which are less than the pulse intervals therebetween;
said electrode arrays *directly* confronting each other across a space containing an ionizable medium, such that any electrode in said first array is substantially equidistant from the two closest electrodes in said second array.

19. An apparatus for moving air comprising:
a first array of electrodes;
a second array of [electrdes] *electrodes*, the electrodes of said second array having a cross-sectional area larger than the cross-sectional area of the electrodes in said first array;
the distance between any two adjacent electrodes in said first array being substantially equal to the distance between any two adjacent electrodes in said second array[.];
said electrode arrays *directly* confronting each other across a space containing air such that any electrode in said first array is substantially equidistant from the closest two electrodes in the second array; and
generating means coupled between said first array and said second array, for generating a signal comprising voltage pulses of a single polarity, said generating means including means for biasing said signal so that the absolute value of the voltage of said signal stays above a predetermined minimum value.

22. *A diode-type electrokinetic transducer for moving and cleaning ambient air without mechanical means, comprising:*
*a first array of ion emitting surfaces;*
*a second array of maxisectional ion receiving surfaces, the cross-sections of the ion receiving surfaces are larger in area than the cross-sections of the ion emitting surfaces in the first array; and,*
*a source of exciting voltage connected in a circuit path between the said first array and said second array for producing voltage pulses of a single polarity, the durations of which are less than the pulse intervals therebetween;*
*said arrays directly face each other across a space containing an ionizable medium, such that any ion emitting surface in said first array is substantially equidistant from the two closest ion receiving surfaces in said second array;*
*wherein upon energizing the arrays, air flows from the first array past the second array and air-borne particulates are precipitated onto an ion receiving surface of the second array.*

23. *A diode-type electrokinetic transducer, comprising:*
*a first array of ion emitting surfaces;*
*a second array of maxisectional ion receiving surfaces, the cross-sectional area taken perpendicular to the major dimension of the ion receiving surfaces is a larger dimension than the cross-sectional area taken perpendicular to the major dimension of the ion receiving surfaces in the first array; and*
*a source of exciting voltage connected in a circuit path between said first array and said second array for producing voltage pulses of a single polarity, the durations of the pulses are less than the intervals between each pulse;*
*said arrays directly face each other across a space containing an ionizable medium, such that any ion emitting surface in said first array is substantially equidistant from the two closest ion receiving surfaces in said second array.*

24. *A diode-type electrokinetic transducer, comprising:*
*a first array of ion emitting surfaces;*
*a second array of ion receiving surfaces, the cross sections of the ion receiving surfaces of the second array are larger in area than the cross sections of the ion emitting surfaces of the first array;*
*the distance between any two adjacent ion emitting surfaces in the first array being substantially equal to the distance between any two adjacent ion receiving surfaces in said second array;*
*the ion emitting and ion receiving surfaces of the respective first and second arrays directly confronting each other across a space containing ambient air such that any ion emitting surface in the first array is substantially equidistant from the closest two ion receiving surfaces in the second array; and,*
*a voltage pulse generator coupled between the first and second array for generating a signal having voltage pulses of a single polarity, the generator biasing the signal so that the absolute value of the voltage of said signal stays above a predetermined minimum value;*
*wherein upon energizing the arrays, air ions flow from the first array past the second array and air-borne particulates are precipitated onto an ion receiving surface of the second array.*

* * * * *